United States Patent
Gliozzo

(10) Patent No.: US 9,135,240 B2
(45) Date of Patent: *Sep. 15, 2015

(54) LATENT SEMANTIC ANALYSIS FOR APPLICATION IN A QUESTION ANSWER SYSTEM

(71) Applicant: International Business Machines Corporation, Armonk, NY (US)

(72) Inventor: Alfio M. Gliozzo, New York, NY (US)

(73) Assignee: International Business Machines Corporation, Armonk, NY (US)

(*) Notice: Subject to any disclaimer, the term of this patent is extended or adjusted under 35 U.S.C. 154(b) by 279 days.

This patent is subject to a terminal disclaimer.

(21) Appl. No.: 13/765,323

(22) Filed: Feb. 12, 2013

(65) Prior Publication Data
US 2014/0229161 A1    Aug. 14, 2014

(51) Int. Cl.
*G06F 17/27*    (2006.01)
*G06F 17/28*    (2006.01)

(52) U.S. Cl.
CPC .............................. *G06F 17/2785* (2013.01)

(58) Field of Classification Search
CPC ..... G06F 17/28; G06F 17/2785; G06F 17/21; G06F 17/2735; G06F 17/27; G06F 17/278; G06F 17/2795; G06F 17/18; G06F 17/279; G10L 15/183; G06Q 50/01; G06Q 50/22
USPC ............................................ 704/3, 4, 7, 9, 10
See application file for complete search history.

(56) References Cited

U.S. PATENT DOCUMENTS

| | | | |
|---|---|---|---|
| 6,446,061 B1 | 9/2002 | Doerre et al. | |
| 6,871,174 B1 | 3/2005 | Dolan et al. | |
| 7,051,017 B2 | 5/2006 | Marchisio | |
| 7,526,425 B2 | 4/2009 | Marchisio et al. | |
| 7,752,243 B2 | 7/2010 | Hoeber et al. | |
| 8,229,957 B2 | 7/2012 | Gehrking et al. | |
| 8,396,824 B2 * | 3/2013 | Au .................................. | 706/55 |
| 2002/0059289 A1 | 5/2002 | Wenegrat et al. | |
| 2003/0018626 A1 | 1/2003 | Kay et al. | |
| 2003/0061028 A1 | 3/2003 | Dey et al. | |
| 2003/0084066 A1 | 5/2003 | Waterman et al. | |
| 2003/0191627 A1 * | 10/2003 | Au .................................. | 704/9 |
| 2003/0217335 A1 | 11/2003 | Chung et al. | |
| 2004/0153311 A1 | 8/2004 | Liu et al. | |
| 2005/0165600 A1 | 7/2005 | Kasravi et al. | |

(Continued)

OTHER PUBLICATIONS

U.S. Office Action dated Aug. 1, 2014 received in related U.S. Patent Application, namely U.S. Appl. No. 13/966,902.

(Continued)

*Primary Examiner* — Edgar Guerra-Erazo
(74) *Attorney, Agent, or Firm* — Scully, Scott, Murphy & Presser, P.C.

(57) ABSTRACT

A system and method that improves obtaining similarity measure between concepts based on Latent Semantic Analysis by taking onto account graph structure derived from the knowledge bases by using a vector propagation algorithm, in the context domain, such as a medical domain. Concepts contained in a corpus of documents are expressed in a graph wherein each node is a concept and edges between node express relation between concepts weighted by the number of semantic relations determined from the corpus. A vector of neighbors is created and assigned to each concept, thereby providing an improved similarity measure between documents, i.e., corpus and query against corpus.

9 Claims, 7 Drawing Sheets

(56) References Cited

U.S. PATENT DOCUMENTS

| | | | |
|---|---|---|---|
| 2005/0198026 | A1 | 9/2005 | Dehlinger et al. |
| 2006/0074632 | A1 | 4/2006 | Nanavati et al. |
| 2006/0212415 | A1 | 9/2006 | Backer et al. |
| 2007/0011151 | A1 | 1/2007 | Hagar et al. |
| 2007/0185910 | A1 | 8/2007 | Koike et al. |
| 2009/0204596 | A1 | 8/2009 | Brun et al. |
| 2010/0106486 | A1 | 4/2010 | Hua et al. |
| 2011/0093449 | A1 | 4/2011 | Belenzon et al. |
| 2012/0101736 | A1 | 4/2012 | Dudley et al. |
| 2012/0166180 | A1* | 6/2012 | Au .................................. 704/9 |
| 2012/0203584 | A1 | 8/2012 | Mishor et al. |
| 2012/0313948 | A1 | 12/2012 | Bergman et al. |

OTHER PUBLICATIONS

Vossen, P., "EuroWordNet General Document", Jul. 1, 2002, pp. 1-108.

Maedche, A., et al., "Ontology Learning for the Semantic Web", 2001, IEEE Intelligent Systems, 16(2), pp. 72-79.

Anon, UMLS Database query Diagrams: How to find all information associated with a particular UMLS concept (CUI value), US National Library of Medicine, NIH Mar. 8, 2011.

Mcinnes et al., "Using UMLS Concept Unique Identifiers (CUIs) for Word Sense Disambiguation in the Biomedical Domain," www.tc.umn.edu/~bthomson/publications/btmcinnes-amia2007.pdf.

Matykiewicz et al., "Nonambiguous concept mapping in medical domain." Lecture Notes in Artificial Intelligence, 4029:941-950, 2006.

Lucas, "Patent Semantics: Analysis, Search, and Visualization of Large Text Corpora," Submitted to the Department of Electrical Engineering and Computer Science in Partial Fulfillment of the Requirements for the Degrees of Bachelor of Science in Computer Science and Engineering and Master of Engineering in Electrical Engineering and Computer Science at the Massachusetts Institute of Technology Aug. 20, 2004.

Abate et al., "An Automated Tool for Scoring Biomedical Terms Correlation," 2010 International Conference on Complex, Intelligent and Software Intensive Systems.

International Application No. PCT/US/14/10576 Search Report mailed Jun. 13, 2014.

\* cited by examiner

LATENT SEMANTIC ANALYSIS FOR APPLICATION IN A QUESTION ANSWER SYSTEM

FIELD

The present disclosure generally relates to natural language processing, and more specifically, a system and method for improving standard latent semantic analysis (LSA) technique as applied to different context domains.

BACKGROUND

Similarity estimation between concepts in a knowledge base is a hard problem because of coverage (not all terms in the ontology are usually in the corpus). Improving similarity estimation between concepts is crucial to implement Question/Answering QA analytics for answer scoring. Existing solutions are based on graph algorithms (distance between nodes into graphs derived by the ontology) or corpus based algorithms (distributional or contextual similarity between terms associated to concepts in the ontology). Both solutions are viable but limited because the former does not take into account distributional properties of concepts such as their frequency, while the latter has not enough coverage (not all terms in the ontology are actually in the corpus) and word sense disambiguation is not easy.

BRIEF SUMMARY

There is provided, in one aspect, a system and method that improves obtaining similarity measure between concepts based on Latent Semantic Analysis by taking onto account graph structure derived from a knowledge base by using a vector propagation algorithm, in a particular context domain.

Such a similarity may be used in scoring answers in a question answering application.

In one embodiment aspect, vector propagation algorithm is implemented. The method makes use of semantic vectors not only of individual nodes (concepts) in a graph representation of a document or corpus, but in using average of vector values of neighbors of node of interest.

In one aspect, there is provided a system, method and computer program product for estimating similarity between concepts. The method comprises: receiving a set of concepts related to a corpus of text documents; creating a representative graph structure having graph nodes each representing an LSA (Latent Semantic Analysis) vector associated with a concept, and a node having one or more graph edges, each graph edge representing a strength of a relation between concepts based on an ontology; and deriving, for a concept, a new or modified vector represented by a node in the graph by propagating the LSA vectors against the graph structure, the new or modified vector representing a modified estimated similarity between concepts, wherein a programmed processor device is configured to perform the receiving, creating and deriving.

Furthermore, there is provided a system for estimating similarity between concepts comprising: one or more content sources providing content; a programmed processor device for coupling to the content sources and configured to: receive a set of concepts related to a corpus of text documents in a content source; create a representative graph structure having graph nodes each representing an LSA (Latent Semantic Analysis) vector associated with a concept, and a node having one or more graph edges, each graph edge representing a strength of a relation between concepts based on an ontology; and derive, for a concept, a new or modified vector represented by a node in the graph by propagating the LSA vectors against the graph structure, the new or modified vector representing a modified estimated similarity between concepts.

A computer program product is provided for performing operations. The computer program product includes a storage medium readable by a processing circuit and storing instructions run by the processing circuit for running a method. The storage medium readable by a processing circuit is not only a propagating signal. The method is the same as listed above.

In one embodiment, a context domain includes a medical domain using UMLS (Unified Medical Language System®) and a medical corpus.

BRIEF DESCRIPTION OF THE SEVERAL VIEWS OF THE DRAWINGS

The objects, features and advantages of the present invention will become apparent to one of ordinary skill in the art, in view of the following detailed description taken in combination with the attached drawings, in which.

DETAILED DESCRIPTION

Latent semantic analysis (LSA) while being a technique known in the art to analyze relationships between a set of documents and the terms they contain by producing concepts, LSA is the dominant paradigm for measuring contextual similarity between terms in a corpus. However, LSA techniques do not take into account information from a knowledge base.

Using techniques of the present disclosure, information from a knowledge base(s) in combination with LSA, ultimately provides an improved similarity measure. In the techniques disclosed, each concept is represented in the knowledge base as a node of a graph whose edges between nodes represents a relation between concepts weighted by the number of semantic relations determined from a knowledge base, for example, UMLS. Then using the network generated so far, LSA vector associated to concepts is propagated to their neighbors, providing an improved similarity measure to be used in scoring answers, e.g., in an question answering algorithm.

In one embodiment, those concepts produced by standard LSA are obtained and a graph is produced having data wherein each concept is a node and the edges between nodes represents a relation between concepts, i.e., an ontology. In one embodiment, the edges representing the relations between concepts are weighted by the number of semantic relations determined from a knowledge base.

That is, an improved LSA approach using the graph structure captures a similarity measure between concepts based on Latent Semantic Analysis. The graph structure is derived from the knowledge base(s) by using a vector propagation algorithm in which a vector of neighbors is created and assigned to each concept. This provides an improved similarity measure to be used in scoring answers, e.g., in a question answering system/algorithm. For example, this approach and method is effective for improving answer scoring in a question-answer (QA) system such as IBM Watson™ computer system (Trademark of International Business Machines, Inc., Armonk, N.Y.).

In an example embodiment, the graph structure-based approach is applied for a particular domain, e.g., medical, however, it is understood that the graph structure-based approach is not so limited. In a medical domain application, there may be provided the Unified Medical Language System (UMLS® Registered Trademark of the National Library of Medicine) Metathesaurus, and a medical corpus. In this medical domain example, a knowledgebase, e.g., embodied in a memory device such as a database, provides a metathesaurus of concepts and relationships based on the Unified Medical Language System (UMLS) or MetaMap. A medical corpus includes a search engine such as PubMed® (Registered Trademark of National Library of Medicine), for example.

Figure 1:
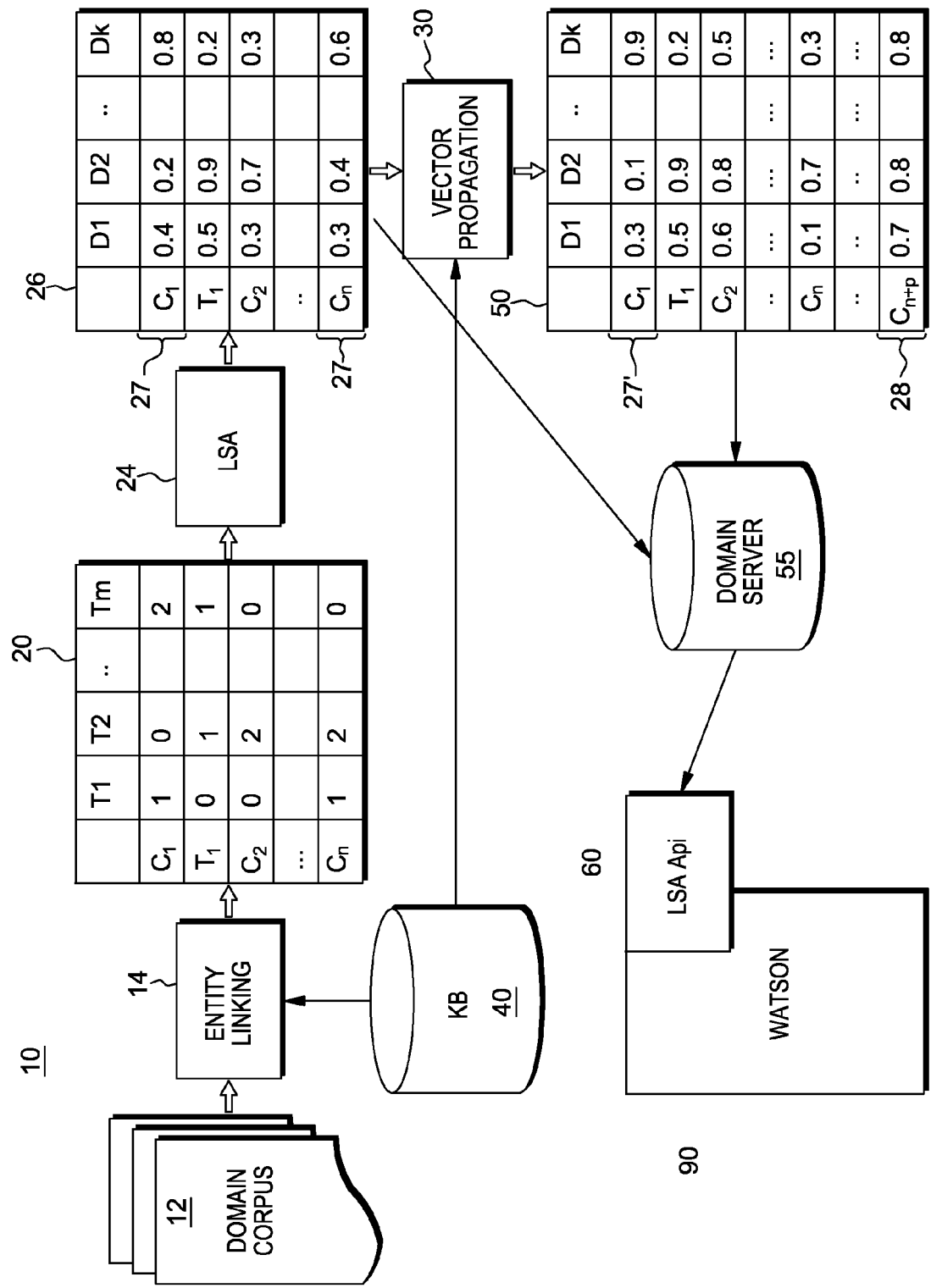
FIG. 1 depicts one embodiment of a system 10 to estimate similarity between concepts in a particular context domain in one embodiment.

FIG. 1 depicts one embodiment of a system 10 to estimate similarity between concepts in a particular domain. As shown, a corpus 12 of text documents is provided as is a knowledgebase (KB) 40 of concepts and relations for a particular domain. Data contained in the corpus 12 set of documents and KB 40 is accessed via a respective computing system interface including wired or wireless network connection. For purposes of description, the methods and system described herein are in a medical domain. Thus, in one example implementation, the knowledgebase (KB) for a medical domain may include the UMLS Metathesaurus 40 and the a medical corpus 12 of text documents. An entity linking tool 14 having software interfaces with both the UMLS repository 40 and the domain corpus 12 is provided to receive these documents and concepts and provide concepts related to the corpus using techniques known in the art. In an example embodiment of a medical domain, entity linking tool 14 includes a medical Extended Slot Grammar (ESG) tool which is a syntactic parser adapted to the medical domain. ESG parser has been used by IBM Watson™ that receives a set of concepts from the UMLS Metathesaurus 40 related to the corpus of medical text documents.

In one embodiment, the data received by the entity linking tool 14 includes the set of concepts and relationships from the text documents, indicated by text document identifiers. Component 14 may include any concept mapper (e.g., device or system that likes terms in text to concepts/entities in an ontology). In one example, the entity linking tool 14 may include a Medical ESG, obtains text document identifiers from the corpus 12 to form a matrix relating the UMLS concepts $C_1$, $C_2$, ..., $C_n$ to the set of text documents, e.g., represented as text document identifiers T1, T2, ... Tm 20 of the corpus. As shown in FIG. 1, the concept mapper 14 may further generate matrix rows that include terms, e.g., $T_1$. The matrix 20 relating terms and/or concepts to text document IDs includes word counts, i.e., is populated with the number of occurrences of the term/concept in the row in the text document in the column, e.g., a "2" indicating that a given concept (or term) has been found twice in a given text document; a "0" indicating that the concept has never been found in a specific text document, etc..

As further shown in FIG. 1, LSA processing is then applied to this data via software interfaces to generate a further matrix representation relating domains or topics to the concepts i.e., a degree of association between the concept and the domain or topic. There is performed by programmed components an LSA analysis 24 that process the matrix 20 of terms and analyzing relationships between a set of documents and the concepts $C_i$ and terms $T_i$ they contain to a set of domains or topics D1, D2, ..., Dk related to the concepts/terms. This LSA processing includes performing a singular value decomposition (SVD) or similar dimensionality reduction technique (e.g., PLSA, LDA) to construct a reduced matrix 26 containing word counts per text unit, e.g., paragraph. SVD results in a matrix representation 26 having reduced amount of columns than matrix 20.

In one aspect, the knowledgebase is used to help improve the LSA interpretation of concepts. Vector propagation is implemented to produce other concepts besides those found or that occur in the corpus (those not in the corpus) but rather found in the KB. That is, using a graph structure, there is propagated the information of the LSA generated vectors, each vector representing a particular word (domain or topicality), e.g., a word cancer (or other disease name) may be a domain or topic of oncology. As shown in FIG. 1, the LSA vectors are shown as rows 27 in the matrix representation 26.

Once a vector is provided for each word (concept in the ontology), then the graph is used to propagate LSA vector for the concept in the undirected graph representation.

In particular, a vector propagation algorithm is run that applies functions on the data to assign an average LSA vector of neighbors to each concept. According to one embodiment, the method steps implement include: a) for each node in the generated graph, deriving a new vector by averaging the LSA vectors of the neighborhood of the current concept; and, b) iterating step a) until most of the concepts in the graph have vectors.

Figure 2:
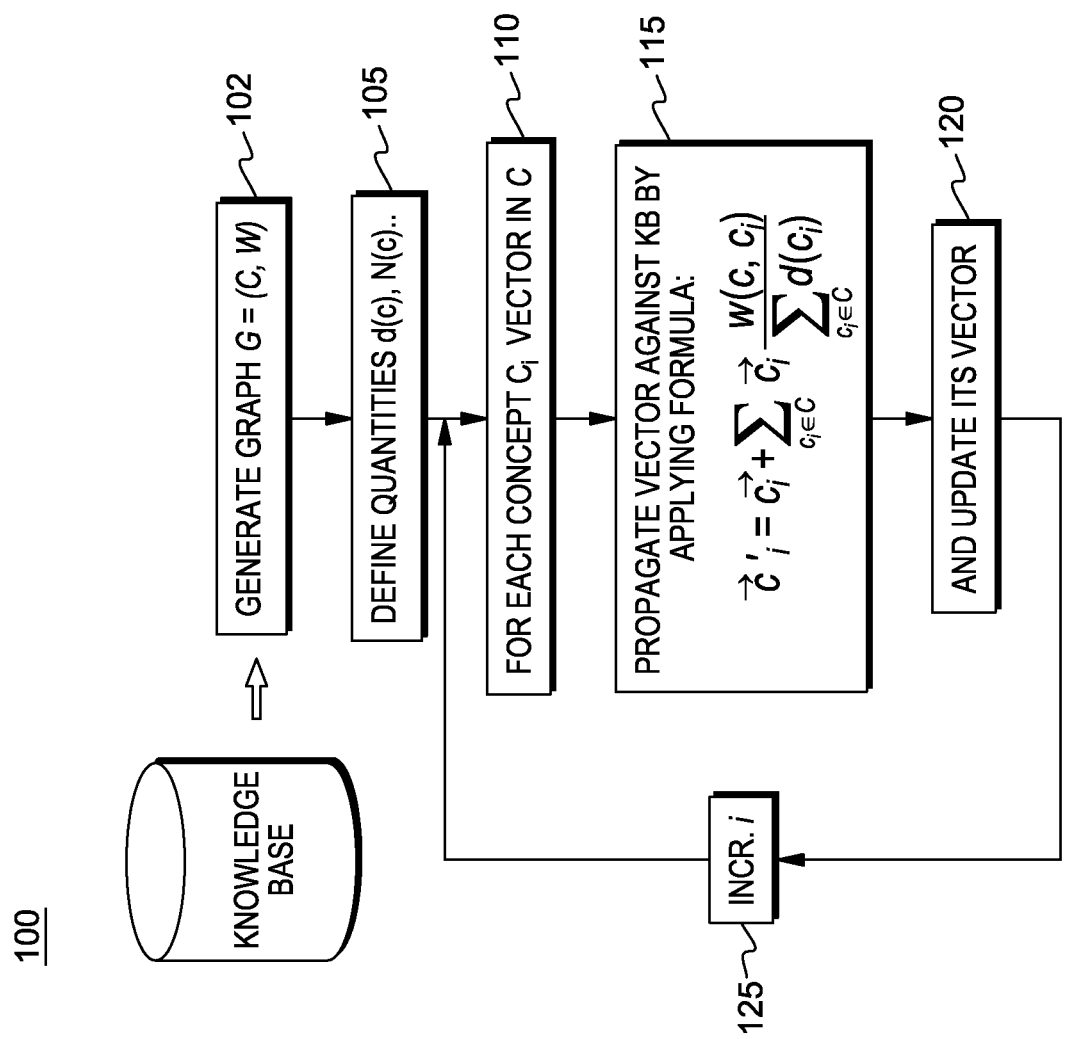
FIG. 2 depicts an embodiment of a vector propagation method to estimate similarity between concepts in a particular domain in one embodiment.

FIG. 2 shows a schematic of the vector propagation algorithm 100. In the algorithm at 102, from the knowledgebase 40 of any domain, e.g., a knowledgebase such as UMLS for a medical domain application, computer system based processing performs extracting a graph G of the relations between concepts, i.e., modeled as a set of concepts C and links associated therebetween with the weights W indicating degree of relatedness or strength (a probability) such that G=(C, W). For example, $W(c_i, c_j)$ is the number of semantic relations involving both concept $c_i$ and $c_j$ in the knowledge base.

Further, in FIG. 2, at 105, there is defined a quantity N(c), wherein $N(c)=\{c_i \in C | w(c,c_i) > 0\}$ represents the number of relations involving the concept c in the knowledge base.

Further, a quantity d(c) is defined, wherein $$d(c) = \sum_{c_j \in N(c)} w(c_j, c),$$

is the degree of the node c in the graph. It is calculated by performing the sum of the weights of the relations involving that node.

FIG. 2 shows further shows the method at 110, wherein after graph G generation, a processing loop begins for each concept $c_i$ in C where there is performed at 115 applying a formula shown in equation 1 and at 120 updating the concept vector $\vec{c}$ to form new concept vector $\vec{c}'$; i.e., given a vector $\vec{c}$, this vector is propagated against the KB such that:

$$\vec{c}' = \vec{c} + \sum_{c_i \in N(c)} \overline{\vec{c}_i \frac{w(c, c_i)}{d(c_i)}} \qquad 1)$$

$c_i$ is a neighbor concept and $\vec{c}_i$ is its vector, $\vec{c}$ is the vector of concept c before propagation and $\vec{c}'$ is the vector after propagation has been done. More particularly, given the input concept c, the algorithm performs: identifying the neighbor concept in said undirected graph; identifying their vectors; taking an average of those vectors, and replacing the original concept vector $\vec{c}$ with new vector average (summing itself) according to the equation 1). That is, the vector updating includes adding an average of the vectors of the neighboring concepts. In the equation, these vectors are normalized (using the horizontal bar to denote the normalization operation, which return vectors of unitary length). A new vector $\vec{c}'$ is generated as the initial concept vector is propagated in the KB. This step is done for all vectors in the knowledge base.

Thus, as shown in FIG. 1, after application of vector propagation algorithm, the resulting generated new matrix 50 mapping concepts or terms to domains includes modified vectors, such as modified LSA vector depicted by row 27' and includes extra rows, e.g., row 28, indicating additional found concepts, e.g., $c_{n+p}$.

Figure 3:
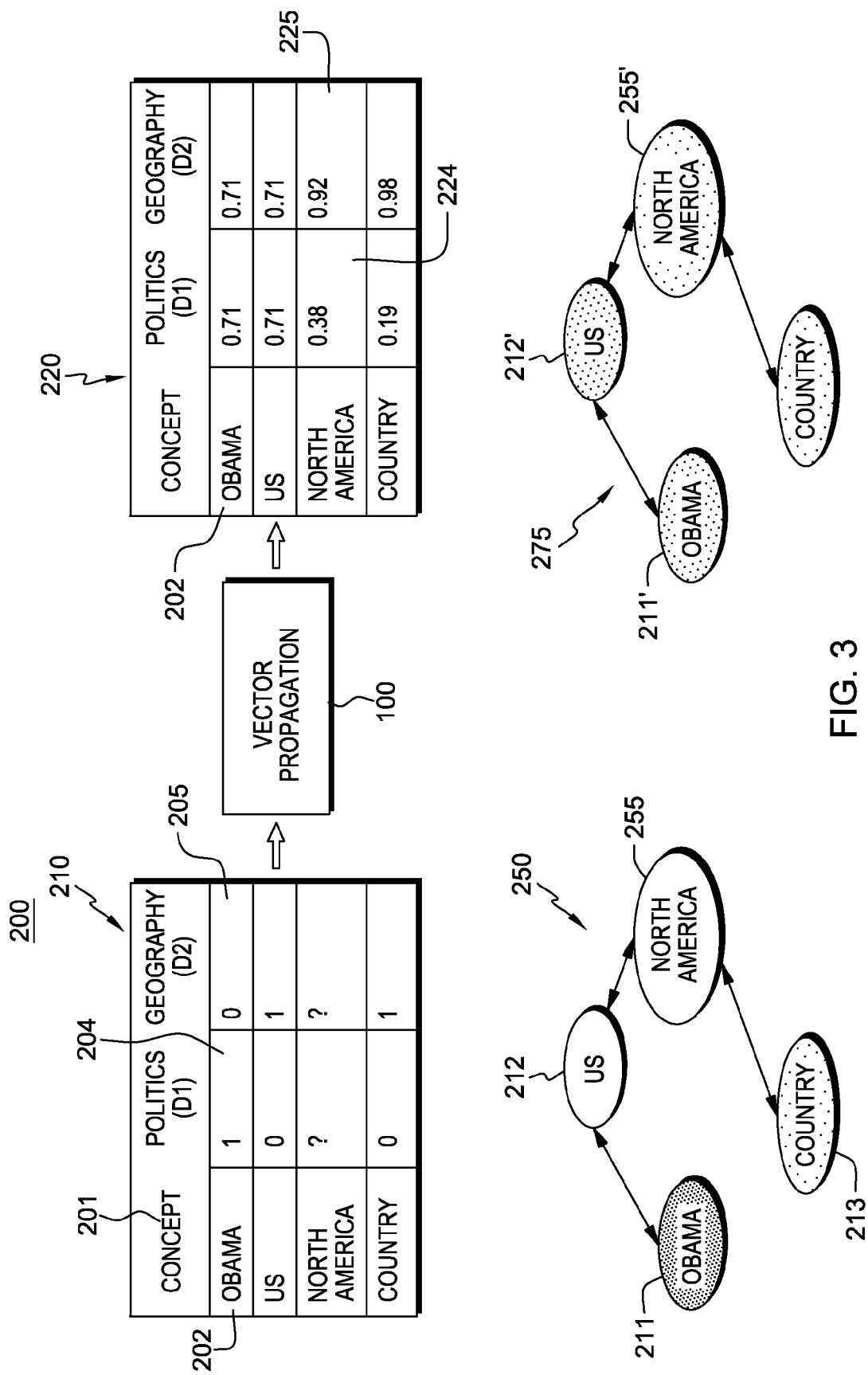
FIG. 3 shows a graphical depiction of the vector propagation algorithm 200 that applies functions on the data to assign an average LSA vector of neighbors to a concept in an example implementation.

FIG. 3 shows a graphical depiction of the vector propagation algorithm 200 that applies functions on the data to assign an average LSA vector of neighbors to each concept. As shown in FIG. 3, from a KB, the following example data 210 may be extracted:
Obama presidentOf US;
Obama bornIn US;
US locatedIn NorthAmerica; and
NorthAmerica isA country As shown in FIG. 3, this data includes concepts 201 (Obama, US, North America, and Country), and domains (D1) Politics and (D2): Geography. Strengths of each of the concepts in relation to each domain is indicated in table 210. For example, for a concept "Obama" 202 as there are shown associated respective weights 204, 205, indicating relation of the concept to respective D1, D2 domains for the concept Obama 202. As shown in FIG. 3, no weight is given to the concepts "North America" for each domain.

This data set 210 extracted from a knowledge base is used to form and generate graph

G=(C, W)

where C is a set of concepts and a W set of relation weights (the strength of relations among the concepts). The generated undirected graph 250 based on the data 210 shown in FIG. 3 shows a filled graph node 211 for concept "Obama" relating to domain D1, and graph nodes 212, 213 indicating respective concepts "US" and "Country", these Country and US concepts having an associated weight relating by an ontology to domain D2. However, as shown in FIG. 3, no strength relations are indicated for concept "North America" in relation to US or Country as indicated by unfilled graph node 255 of the extracted graph 250. As a result of applying vector propagation algorithm 100 as shown in FIG. 2, there results generating of the following vectors and associated weights in the generated graph table 220:
W(Obama,US)=2
W(US, NorthAmerica)=1
W(US, Obama)=2
W(NorthAmerica, US)=1
W(country, NorthAmerica)=1
W(NorthAmerica, country)=1

Note in the simple example, by mapping the extracted Knowledge Base into a graph, relations are collapsed in a single relation (e.g., Obama is related to the US). Thus, the weight W(Obama, US), i.e., strength of the concept, is shown having a strength of 2 given Obama's connectedness or relatedness as being born in and located in the US.

As a result of vector propagation, and the iterative process shown in FIG. 2, the concepts shown in graph 250, of FIG. 3, now include changed or modified LSA vectors.

For example, these changed or modified vectors are reflected in updated table 220 indicating data including concepts 202 (Obama, US, North America, and Country), and domains. (D1) Politics and (D2): Geography, and their respective concept strengths in relation to each domain is indicated as respective weights 204, 205, related to respective D1, D2 domains for the concept Obama 201. As shown in FIG. 3, no weight has been given to the concepts North America for each domain from the original extracted data as the strengths of relations is not evident from the original corpus. Qualitatively, graph node 255 representing North America concept does not show a color as no weight has been given to the concepts North America for each domain D1, D2. However, as a result of applying vector propagation algorithm 100 wherein the method employs: a) for each node in the generated graph, deriving a new vector by averaging the LSA vectors of the neighborhood of the current concept; and, b) iterating step a) until most of the concepts in the graph have vectors, a new generated graph 275 results showing the new vectors representing new or modified concept vectors (and new computed weight associated with each concept). For example, the strength of concept vector "Obama" 202 has been changed and the changed vector for concept Obama now reflects a strength of an association to "Geography" concept as a result of vector propagation whereas, in the original extracted graph 250, there was no strength/relation evident. Further, the vector for concept North America now is modified to indicate associated weight values 224, 225 due to found relations and associated strengths with concepts in Politics and Geography domains. Qualitatively, the resulting graph 275 indicates the two nodes 211' and 212' representing concepts "Obama" and "US" as having the same color blend (a merge of color of nodes 211, 212) due to a result of vector propagation which results in both as of Obama concept and US concept having equal strengths 0.71 (in the respective D1, D2 domains). Further, qualitatively, node 255' representing North America concept now indicates a color resulting from the computed new weights associated with the domains D1, D2.

An example application of the system shown in FIG. 1 implementing the vector propagation algorithm of FIG. 2, results in improved accuracy in the medical domain using a Medical Corpus (1G) and using UMLS knowledgebase. In this application, LSA technique is performed on concepts and not only terms. Using relationships between concepts in the UMLS ontology improves both: 1) Coverage: representing terms not in the corpus; and 2) Quality: using topics of related concepts to estimate the topic (domain) of the target concepts. Thus, in one aspect, using the obtained similarity between Concept Unique Identifiers (CUIs) to define an answer scorer used by a Question-Answer (QA) system such as IBM Watson™ 90 for the Medical Domain application.

Figure 4A:
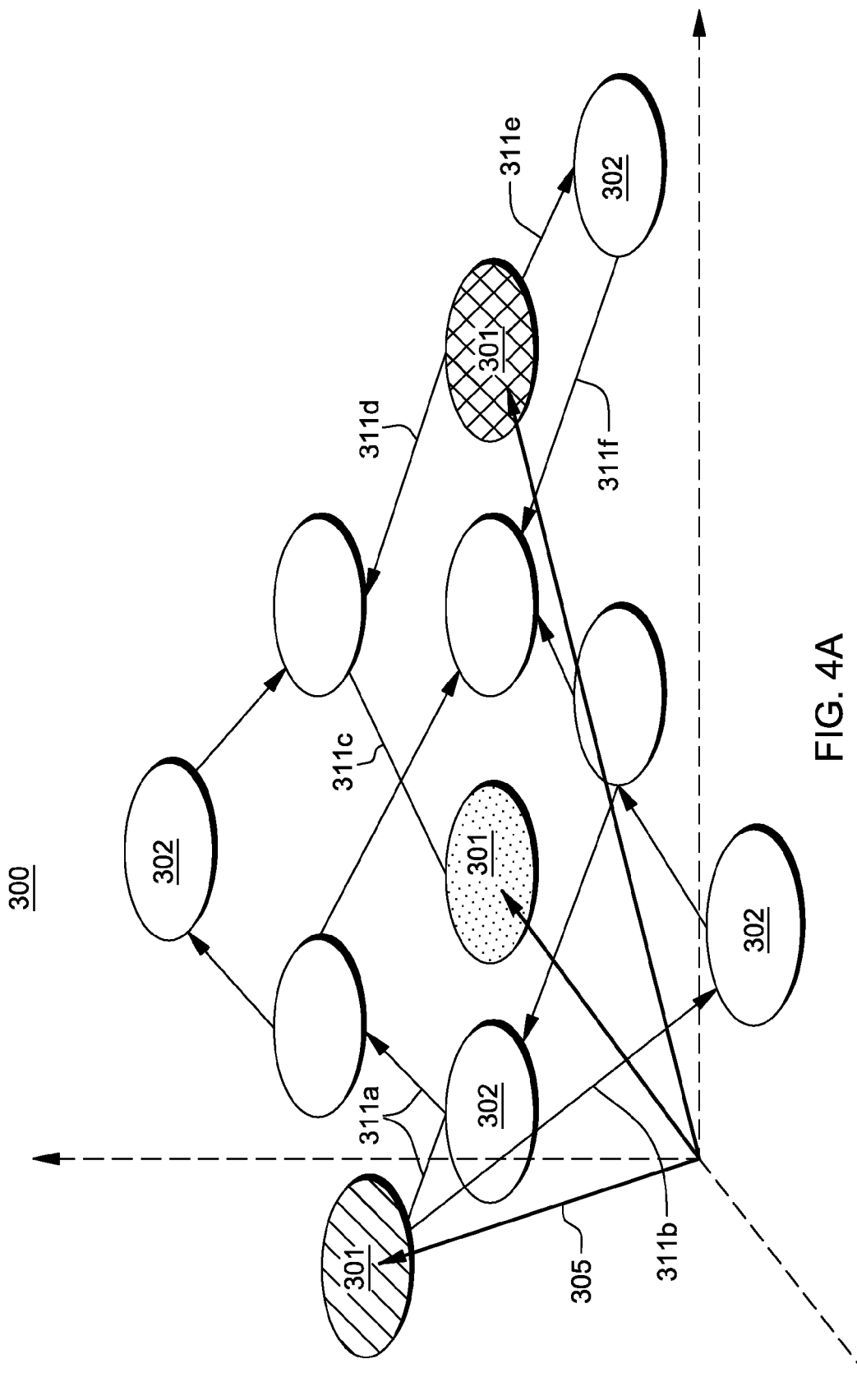
FIGS. 4A-4C generally visually depicts application of vector propagation algorithm applied to an example medical domain application.
Figure 4B:
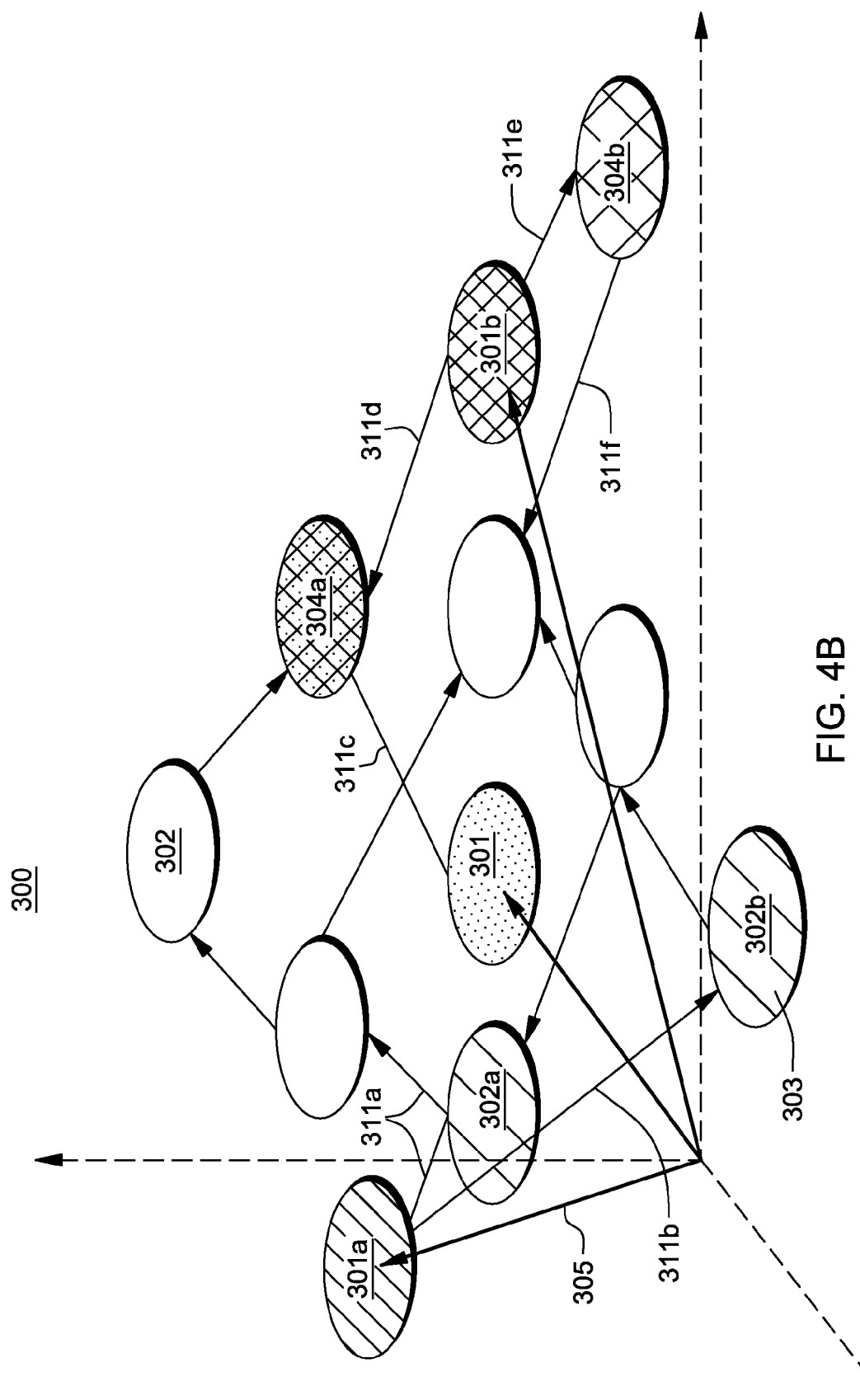
Figure 4C:
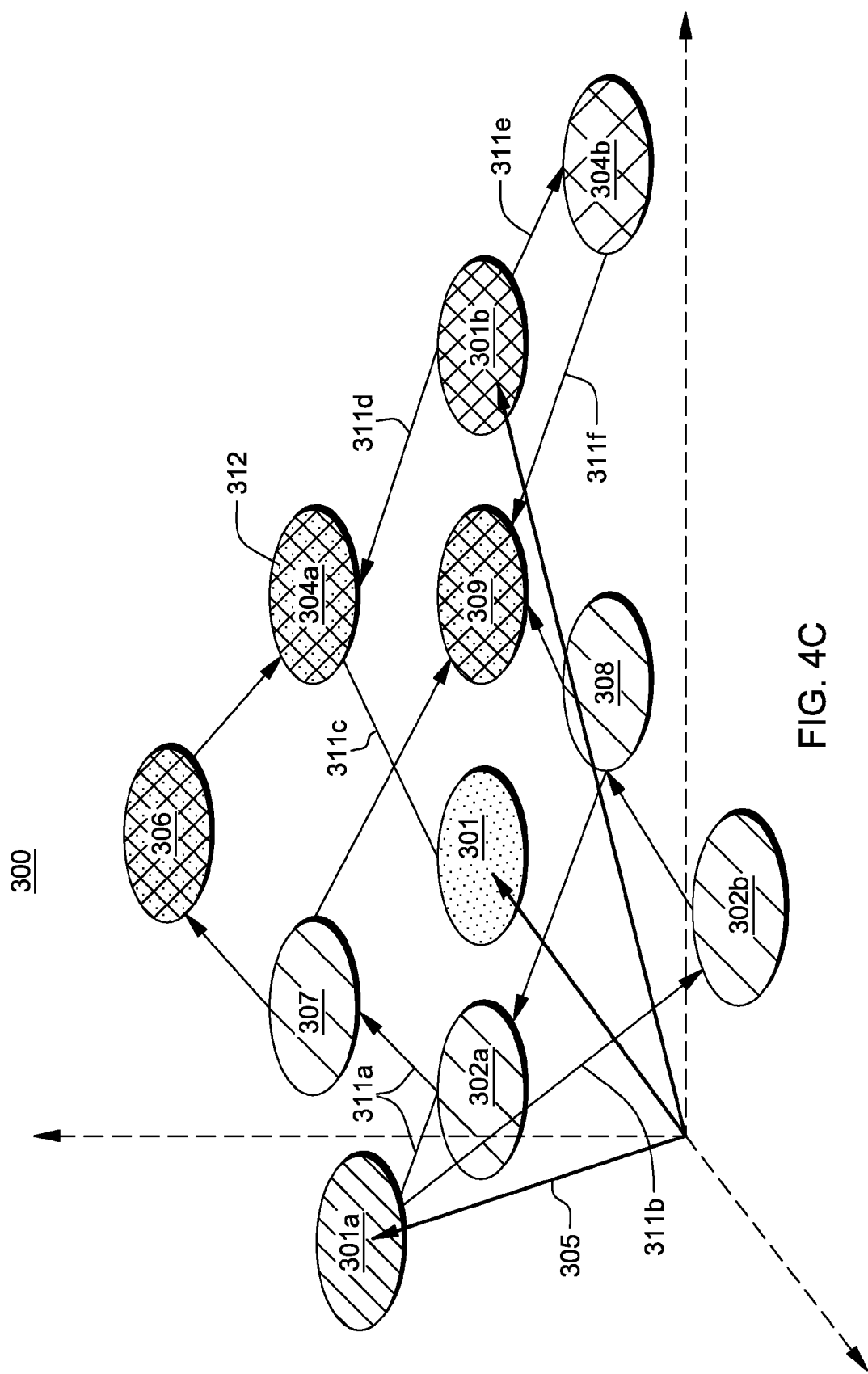

FIGS. 4A-4C generally depicts algorithm stages pertaining to an example medical domain application, wherein the medical domain, from the UMLS KB, there is provided a set of semantic relations among concepts (and obtain domain relations). In one aspect, a UMLS semantic relation includes an "ISA" (is a) relation and many other types of relations (e.g. has$_{13}$ location). A (undirected) graph 300 of the relations is generated from the UMLS KB as shown in FIG. 4A that includes nodes 301 representing concepts (vectors). For each concept, as shown in the matrix data representation of FIG. 1, a row represents a LSA concept vector 305. In graph 300, nodes 302 represent KB CUI concepts having no associated LSA vector. From the algorithm, in view of FIG. 4B, in a successive fashion, a concept vector 305 is propagated, i.e., compared against neighbor nodes, and an average obtained of the neighborhood. The process is iterated several times (e.g., two times), but the parameter can vary.

For example, in the vector propagation algorithm, for each pair of CUIs 301, an edge is introduced if there exists at least one UMLS relation. In one aspect, a "weight" is the number of relations in common between the two nodes. Thus, in initial vector propagation, for the example shown in FIG. 4A, new edges 311*a*-311*f* may be found. For CUI node 301 represented by vector 305, edges 311*a* and 311*b* are introduced as depicting at least one UMLS relation (a weighted relation) between other respective concepts 302. FIG. 4B is an example vector propagation algorithm stage where, for each CUI in UMLS, a new LSA vector is assigned by averaging the vectors of the neighborhood about concept represented by node 301*a*. For example, as a result of new edges 311*a* and 311*b* in a neighborhood of nodes about concept 301*a*, new CUI nodes 302*a* and 302*b* are introduced having associated vectors. That is, in FIG. 4B, vector propagation algorithm shows as a result, the concepts 302*a*, 302*b* are beginning to form via inference, i.e., a concept is related to a known (neighboring) concept, i.e., is similar. Qualitatively, these two new nodes 302*a*, 302*b* are shown having a mix of color 303 based on the CUI associated with a new vector resulting from vector propagation. Likewise, in FIG. 4B, as a result of vector propagation, an averaging of the vectors of the neighborhood about concept represented by node 301*b* results in two new additional nodes 304*a*, 304*b* being added indicated as new or modified concepts having new LSA concept vectors. Qualitatively, as shown in FIG. 4B, new node 304*a* is generated from vector propagation as shown having a mix of color 312 based on concept data from CUI nodes 301 and 301*b* as it relates to at least these two neighboring concepts via edges (relations) 311*c* and 311*d*.

FIG. 4C shows a further result of iterating the vector propagation process until most CUIs have vectors. That is, in FIG. 4C, as a result of vector propagation iteration, an averaging of the vectors of the neighborhood about concept represented by node 301*b* results in new additional vectors being generated for CUI nodes 306, 307, 308 and 309 as shown, indicated qualitatively by a mix of color 313 as it relates to at least two neighboring concepts.

In sum, as shown in FIG. 1, the new generated matrix 50 (after vector propagation) includes the same information, however, 1) all concepts in KB are now vectors, i.e., exhibits increased coverage; and 2) the quality of the vectors for the concepts (even those in the corpus) as they are driven by the ontology. This new generated matrix 50 is input to a memory storage device such as data base 55 that provides a software interface to make the generated matrix 50 available to the IBM Watson™ computing system 90 and/or to an LSA application 60 running therein.

The range of applicability of this enhanced LSA processing algorithm exceeds that for applications such as a QA system, such as implemented by IBM Watson™ as shown in FIG. 1. Its adaptation to the medical domain can be used to improve knowledge management and retrieval capabilities of medical system. More generally, the enhanced LSA processing algorithm can be used to implement: 1) answer scoring, 2) Passage Scoring, and/or Answer Lookup. The enhanced LSA processing algorithm can be further used to enhance many components such as Topicalized Wide Relation and Entity Extraction (TWREX) answer lookup applications, and Named Entity Recognition/ Word Sense Disambiguation applications.

Figure 5:
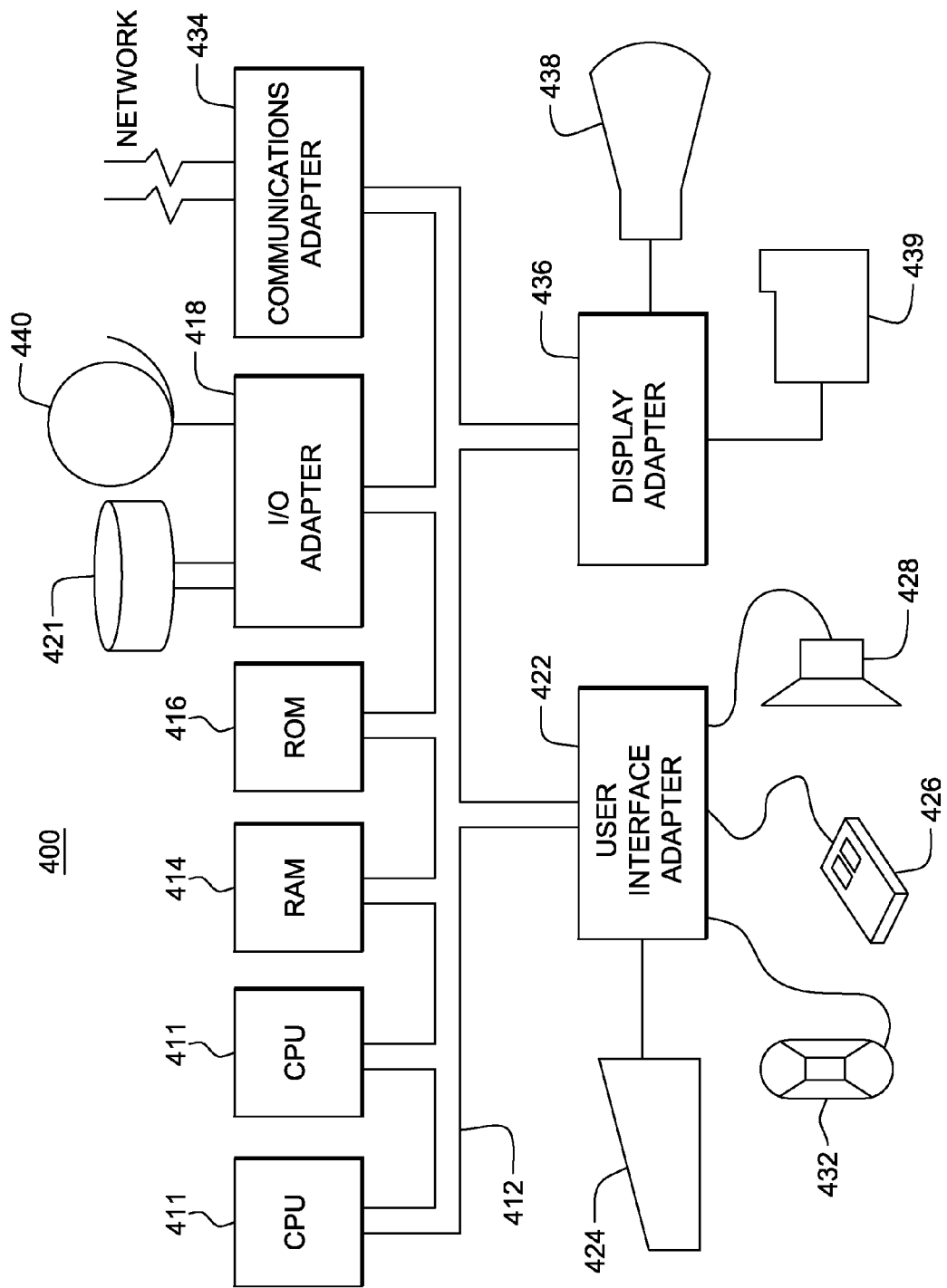
FIG. 5 illustrates one embodiment of a hardware configuration of a computing system 400 employing the system of FIG. 1 and vector propagation algorithm of FIG. 2.

FIG. 5 illustrates one embodiment of an exemplary hardware configuration of a computing system 400 programmed to perform the method steps described herein with respect to FIGS. 1-2. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

The invention claimed is:

1. A method for estimating similarity between concepts, the method comprising:
   receiving a set of concepts related to a corpus of text documents;
   creating a representative graph structure having graph nodes each representing a latent semantic analysis (LSA) vector associated with a concept, and a node having one or more graph edges, each graph edge representing a strength of a relation between concepts based on an ontology; and
   deriving, for a concept, a new or modified vector represented by a node in the graph by propagating the LSA vectors against said graph structure, said new or modified vector representing a modified estimated similarity between concepts,
   wherein a programmed processor device is configured to perform said receiving, creating and deriving.

2. The method as claimed in claim 1, wherein said propagating a vector of a concept against said graph structure includes averaging the LSA vectors neighboring said concept.

3. The method as claimed in claim 1, wherein said corpus of text documents includes a knowledgebase (KB), said representative graph structure being generated from ontologies found in the KB.

4. The method as claimed in claim 3, wherein said knowledgebase includes a medical knowledgebase.

5. The method as claimed in claim 3, wherein said created graph structure is an undirected graph generated from ontologies found in the KB, said created graph showing the relations of concepts weighted by a number of relations, wherein each edge between related concepts is a weight representing the number of relations.

6. The method as claimed in claim 5, wherein a semantic relation includes an ISA relation.

7. The method as claimed in claim 5, wherein said undirected graph is derived by collapsing each of different relations between concepts in the knowledge base.

8. The method as claimed in claim 5, wherein said vector propagating comprises:
   for a known LSA concept vector $c_i$, applying a formula against data of said undirected graph, said formula comprising:

$$\vec{c}'_i = \vec{c}_i + \sum_{c_j \in N(c)} \vec{c}_j \frac{w(c, c_i)}{d(c_i)}$$

where c is a neighbor vector concept, $\vec{c}_i$, is the concept vector propagated against the graph, $\vec{c}'_i$ is a new concept vector, $w(c, c_i)$ is the number of semantic relations involving concepts c and $c_i$, and d(c) is an average vector.

9. The method as claimed in claim 8, wherein the applying said vector propagation formula comprises: given a concept vector "c",
   identifying the vectors for the concept in graph;
   computing an average of those identified vectors, and
   replacing the original concept vector c with new vector average.

* * * * *